(12) United States Patent  
Schloemer

(10) Patent No.: US 8,040,065 B2  
(45) Date of Patent: Oct. 18, 2011

(54) ELECTRIC LAMP WITH LIGHT-ABSORBING COATING, PRECURSOR SUSPENSION FOR SUCH A COATING AND METHOD OF MAKING SUCH A LAMP

(75) Inventor: Heinz Josef Schloemer, Selfkant-Tueddern (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 180 days.

(21) Appl. No.: 12/513,516

(22) PCT Filed: Nov. 6, 2007

(86) PCT No.: PCT/IB2007/054488  
§ 371 (c)(1),  
(2), (4) Date: May 5, 2009

(87) PCT Pub. No.: WO2008/056319  
PCT Pub. Date: May 15, 2008

(65) Prior Publication Data  
US 2010/0066231 A1 Mar. 18, 2010

(30) Foreign Application Priority Data  
Nov. 9, 2006 (EP) .................. 06123731

(51) Int. Cl.  
*H01J 17/16* (2006.01)  
*H01J 61/30* (2006.01)

(52) U.S. Cl. ........ 313/607; 313/623; 313/627; 313/635; 313/636; 313/642

(58) Field of Classification Search .......... 313/627–642, 313/623  
See application file for complete search history.

(56) References Cited

U.S. PATENT DOCUMENTS 3,961,968 A * 6/1976 Wales .................. 106/38.35  
5,619,102 A * 4/1997 Scholler .................. 313/635

FOREIGN PATENT DOCUMENTS

| DE | 2837280 A1 | 3/1980 |
| DE | 3827451 C1 | 10/1989 |
| EP | 0708978 B1 | 5/1996 |
| GB | 1422491 | 1/1976 |
| WO | 9531001 A1 | 11/1995 |
| WO | 9615548 A1 | 5/1996 |

* cited by examiner

*Primary Examiner* — Anne Hines  
*Assistant Examiner* — Tracie Green

(57) ABSTRACT

An electric lamp is described, which has a quartz glass lamp vessel (10) accommodating an electric element (3, 4). The lamp vessel locally has a light-absorbing, non-reflective coating (11, 12). The coating mainly consists of iron, iron oxide, silicon, and silicon dioxide, the ratio of the weight percentages of iron (compounds) and silicon (compounds) being in the range of 0.17<=iron (compounds)/silicon (compounds)<-12, and the ratio of the weight percentages of silicon and silicon dioxide being in the range of 0.5<=silicon/silicon dioxide<=50.

10 Claims, 2 Drawing Sheets

US 8,040,065 B2

ELECTRIC LAMP WITH LIGHT-ABSORBING COATING, PRECURSOR SUSPENSION FOR SUCH A COATING AND METHOD OF MAKING SUCH A LAMP

FIELD OF THE INVENTION

The invention relates to an electric lamp as defined in the pre-characterizing part of claim 1. The invention further relates to a suspension to be used for said electric lamp and a method of manufacturing such a lamp.

BACKGROUND OF THE INVENTION

An electric halogen incandescent lamp of this type is known from DE 3827451. Besides iron oxide, the known light-absorbing coating further comprises titanium oxide, manganese oxide and magnetite, $FeO_4$, as pigments and, before being burned onto the glass of the lamp vessel, ethyl silicate as an adhesive. The known coating is obtained from a suspension which additionally comprises sodium metaphosphate, glycol, monobutyl glycol ether, and ethanol. The suspension has a relatively complicated composition. The known suspension has the disadvantage of a relatively short shelf life of about 3 days, and when burned onto the lamp vessel and being converted into the light-absorbing coating, this light-absorbing coating can be knocked off the lamp vessel comparatively easily. Furthermore, the manganese oxide often comprises lead (oxide) as a contaminant and is therefore relatively harmful to the environment.

An electric lamp is known from GB 1422491 which has a light-absorbing coating of approximately one-third by weight of glass frit comprising more than 70% by weight of lead oxide, and in addition silicon oxide and boron oxide, as well as the oxides of iron, cobalt and manganese as pigments. It was found that this coating adheres permanently to a lamp vessel made of hard glass, i.e. aluminosilicate glass or borosilicate glass, for example, having a coefficient of thermal expansion in the range of $3*10^{-6}$<=coeff. of thermal exp.<=$7*10^{-6}$, but it quickly starts flaking off glass with an $SiO_2$ content of at least 96% by weight, such as quartz glass, which has a much lower coefficient of thermal expansion than hard glass. Another disadvantage is that this coating comprises substances which are harmful to the environment: cobalt oxide in the pigment and lead oxide in the glass frit. This coating has the further disadvantage that it transmits comparatively much light. This disadvantage becomes proportionally more aggravating as the luminance of the light source is higher, as is the case with, for example, a high-pressure discharge lamp. Such a high-pressure discharge lamp suitable for use as a vehicle headlamp is described in EP 708978. The light-absorbing coating of the lamp disclosed in this document is obtained from, for example, a suspension comprising only silicon powder and iron powder, which is described in patent DE 2837280.

OBJECT AND SUMMARY OF THE INVENTION

It is an object of the invention to provide an electric lamp of the type mentioned in the opening paragraph, which is provided with a light-absorbing coating having a comparatively high light absorption and impermeability to light and yet being durable and comparatively harmless to the environment.

According to the invention, this object is achieved by a lamp as defined in the characterizing part of claim 1. A silicon/silicon dioxide ratio of less than 0.5 causes the light-absorbing properties of the light-absorbing coating to be too low, which might result in disturbing stray light/glare in automotive applications. A silicon/silicon dioxide ratio of more than 12 causes the light-absorbing coating to be too easily removable from the lamp vessel, i.e. in that it can be scratched off comparatively easily or even rubbed off. The silicon, iron oxide and iron together are the light-absorbing pigments which cause the light-absorbing coating to be black. The ratio between the pigments can be varied to a comparatively large extent, such that the light-absorbing pigments still appear black. However, all of the three pigments have to be present in the coating. Iron, mainly present as a metal, is a main component in the coating of the lamp according to the invention. An ethyl silicate hybrid binder used as a precursor material of the coating renders it possible to burn in the coating on the lamp vessel in a short heat treatment of, for example, 2 to 6 seconds, at a temperature of, for example, 700° C. to 900° C. By applying a reducing atmosphere, i.e. by flames having an excess of hydrogen, it is prevented that iron is largely converted into an oxidic form, i.e. in that it has a low oxidation rate as a result of which a high optical density and a high absorption power of the light-absorbing coating remain intact. In general, this low oxidation rate is not more than a few mole percent. Once converted to silicon dioxide, the ethyl silicate hybrid binder provides a high resistance of the light-absorbing coating to flaking off. The light-absorbing coating has the additional advantage that it reflects little or substantially no light. Said reflected light may result in parasitic light in a light beam formed by an optical system, for example, a reflector and a lens.

The light-absorbing coating may be readily obtained from a suspension of a mixture of iron and silicon powders, for example, in a mixture of ethyl silicate hybrid binder and ethanol. After the suspension has been applied and dried, the residue is fixed by heating the coating to about 800° C. for a few seconds. In another favorable embodiment, the light-absorbing coating has a thickness of about 0.007-0.015 mm, which is a satisfactory balance between the light-absorbing properties and the amount of material used. The thickness of the light-absorbing coating can be controlled comparatively easily by controlling the viscosity of the suspension, i.e. by adding, for example, 1 to 3% by weight of glycerin to the suspension.

The use of conventional ethyl silicate, i.e. tetraethyl orthosilicate (TEOS) as a binder in coating suspensions is generally known. A significant difference between ethyl silicate hybrid binders and said conventional acid-catalyzed ethyl silicate hydrolyzates as used for the lamps disclosed in EP-708978 and DE-3827451 is that the binder ($SiO_2$) generated during setting is not only formed from ethyl silicate but also from another source of amorphous silica, for example, $H_2SiO_3$ or colloidal hydrolyzed $Si(OH)_2$. Due to their special formulation and the technology used in their manufacture, the ethyl silicate hybrid binders have very good storage stability and processing properties. The solvent in the ethyl silicate hybrid binder that is used in the suspension of the invention is a mixture of ethanol and 2-propanol. Said ethyl silicate hybrid binder is supplied by, for example, Wacker under the trade name of Silester® XAR. In this product, the degree of hydrolysis and pH has been optimized, i.e. in that about 0.07% by weight of $H_2SO_4$ is provided so as to ensure the required reactivity and adequate storage stability. A pH change, e.g. arising from the addition of fillers, pigments, various additives or solvent evaporation, promotes condensation of the ethyl silicate, and the system will cure more quickly. It is also important that the added components do not introduce uncontrolled amounts of water into the system, as this would adversely affect the processing time/shelf life of the formulation. The ethyl silicate hybrid binder (Silester® XAR) has a shelf life of at least 9 months when stored at 30° C. maximum in a tightly closed original container. It has a milky appearance and a density of 0.92 g/cm³ at 20° C. Its $SiO_2$ content in percent by weight is about 20%.

In a favorable embodiment, the ratio of the weight percentages of iron compounds and silicon compounds is in the range of 0.65<=iron compounds/silicon compounds<=3, and the ratio of the weight percentages of silicon and silicon dioxide is in the range of 2.5<=silicon/silicon dioxide<=12.5. Experiments proved that Fe/Si and Si/SiO₂ ratios within said ranges yield coatings with an even better light absorption and impermeability and a better adhesion, i.e. in that they are less sensitive to scratching or flaking off and cannot be rubbed off.

BRIEF DESCRIPTION OF THE DRAWING

Embodiments of the electric lamp according to the invention are shown in the drawing, in which.

DESCRIPTION OF EMBODIMENTS

Figure 1:
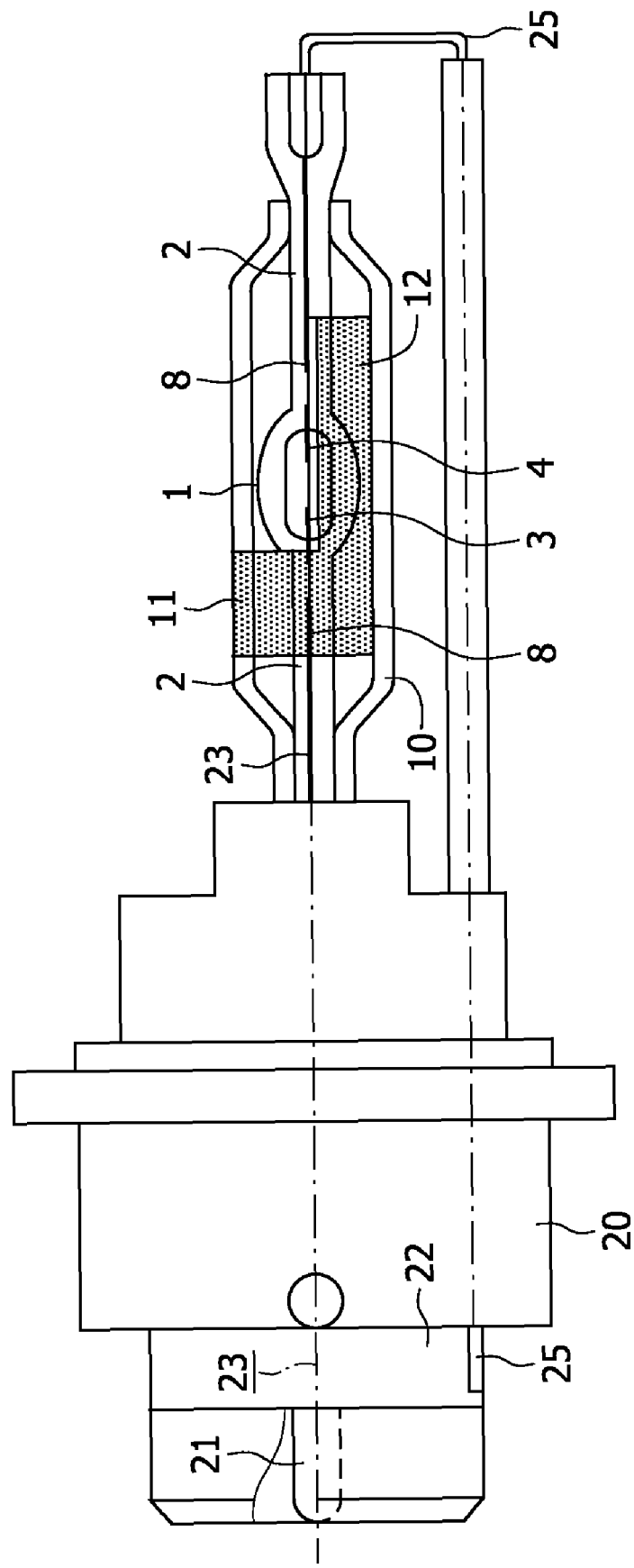
FIG. 1 shows a discharge lamp in a side elevation, partly in a cross-section.

In FIG. 1, the high-pressure discharge lamp has a quartz glass lamp vessel 10 which is sealed in a gastight manner by seals 2, the lamp vessel accommodating an electric element. The electric element comprises electrodes 3, 4 in an inner quartz glass envelope 1 containing an ionizable filling. The filling comprises, for example, mercury, a mixture of metal halide such as sodium iodide and scandium iodide, and a rare gas such as, for example, xenon, for example, with a filling pressure of several bars. Current conductors 8, 23; 8, 25 comprising Mo-foils embedded in the seals 2 of the lamp vessel are connected to the electrodes and issue from the lamp vessel to the exterior. The lamp has a lamp cap 20 fitted with contacts 21, 22.

The lamp vessel is locally covered with a light-absorbing coating 11, 12 which comprises iron (mainly in a metallic and partially in an oxidic form), silicon dioxide, and silicon powder. The coating substantially contains 62% by weight of iron, 30% by weight of silicon and 8% by weight of silicon dioxide. In the embodiment shown, the glass of the coating is UV-absorbing quartz glass.

The coating was obtained from a suspension of 1500 grams of metallic iron powder obtained by conversion of $Fe(CO)_5$, i.e. carbonyl eisenpulver from BASF, 750 grams of silicon powder, 400 grams of ethanol and 700 grams of ethyl silicate hybrid binder, i.e. Wacker Silester® XAR with 20% by weight of $SiO_2$ having a mixture of alcohols as a solvent. Said mixture of alcohols comprises ethanol and 2-propanol. Alternatively usable ethyl silicate binders in the suspension are, for example, Wacker Silester® AR and Wacker Silikat H450N. The coating has a thickness of about 0.009 mm and substantially does not transmit or reflect light and remains adhered to the lamp vessel throughout its lifetime.

Figure 2:
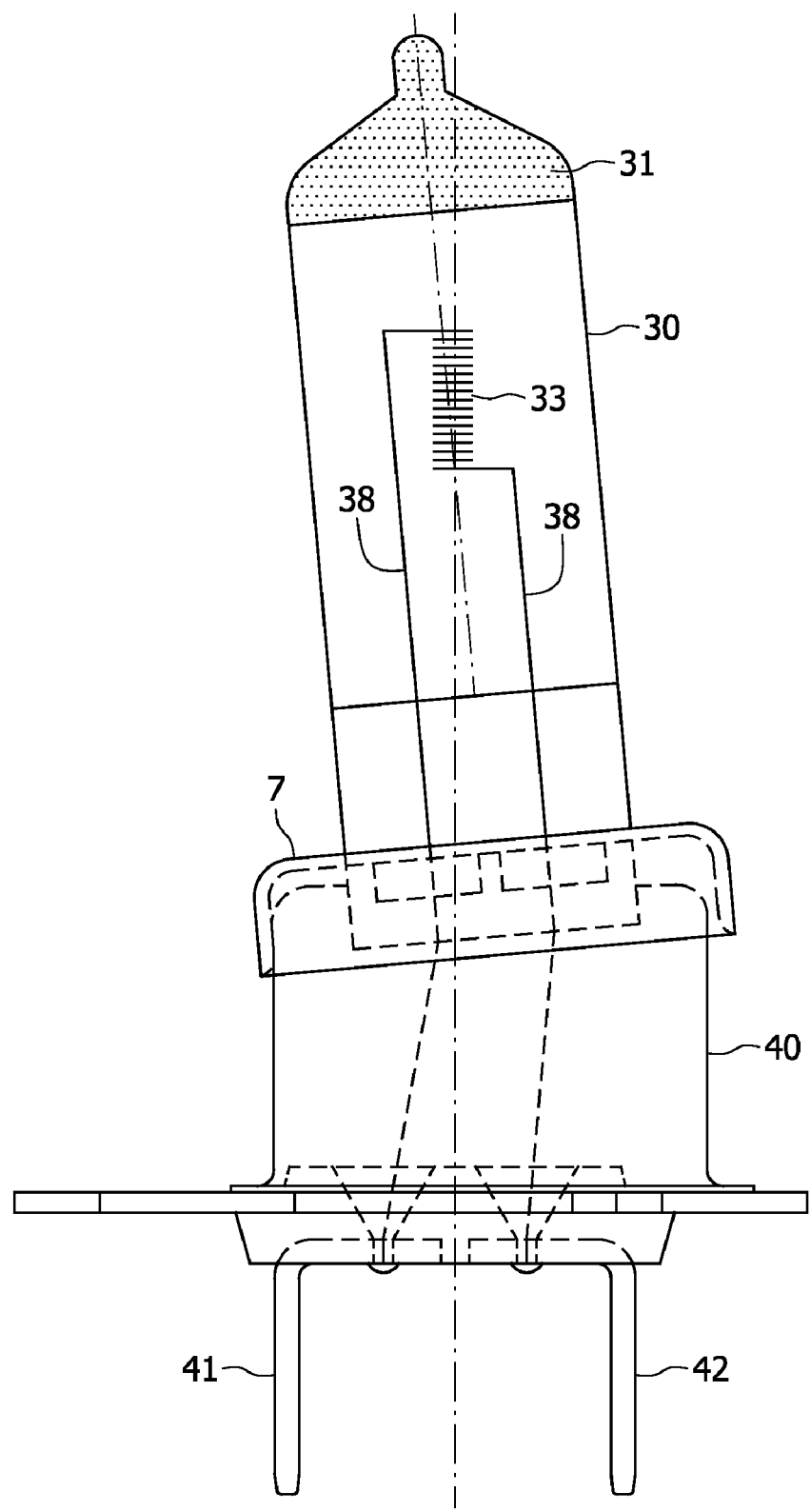
FIG. 2 shows an incandescent lamp in a side elevation.

In FIG. 2, the electric lamp has a lamp vessel 30 made of hard glass accommodating an incandescent body 33 in an inert gas comprising a halogen in the Figure. The hard glass is a borosilicate glass in the Figure, but it may alternatively be an aluminosilicate glass The incandescent body is connected to current conductors 38 which issue from the lamp vessel to the exterior and are connected to respective contacts 41, 42 of a lamp cap 40 fastened to the lamp vessel via a position element 7. The lamp vessel locally has a light-absorbing coating which comprises iron, mainly in a metallic and partially in an oxidic form, silicon dioxide, and silicon powder. The coating substantially contains 63% by weight of iron, 31% by weight of silicon and 6% by weight of silicon dioxide. The coating has a thickness of about 0.011 mm. The coating was obtained from a suspension of 1500 grams of metallic iron powder, 750 grams of silicon powder, 400 grams of ethanol and 800 grams of ethyl silicate hybrid binder having 20% by weight of $SiO_2$, and 50 grams of glycerin. The coating was applied by means of a dipping process, but may alternatively be applied by means of a spraying process. Subsequently, the coating was burned onto the lamp vessel by means of a heating process of flames in a reducing atmosphere for four seconds. The coating was thereby heated to approximately 850° C.

The invention claimed is:

1. An electric lamp comprising a lamp vessel accommodating an electric element to which current conductors are connected, which issue from the lamp vessel to the exterior, said lamp vessel being locally coated with a light-absorbing coating which comprises silicon dioxide and iron compounds comprising iron at least partially in an oxidic form, wherein the coating further comprises silicon which, together with silicon dioxide, forms the silicon compounds, the ratio of the weight percentages of the iron compounds and silicon compounds being in the range of 0.17<=iron compounds/silicon compounds<=12, and the ratio of the weight percentages of silicon and silicon dioxide being in the range of 0.5<=silicon/silicon dioxide<=50.

2. An electric lamp as claimed in claim 1, wherein the ratio of the weight percentages of iron compounds and silicon compounds is in the range of 0.65<=iron compounds/silicon<=3, and the ratio of the weight percentages of silicon and silicon dioxide is in the range of 2.5<=silicon/silicon dioxide<=12.5.

3. An electric lamp as claimed in claim 1, wherein the coating has a thickness in the range of 0.007 to 0.015 mm.

4. A suspension for use on an electric lamp as claimed in claim 1, wherein said suspension comprises up to a total of 100% by weight of the following materials:
   10-70% by weight of iron;
   5-50% by weight of silicon;
   5-30% by weight of at least one alcohol; and
   5-50% by weight of ethyl silicate hybrid binder.

5. A suspension as claimed in claim 4, wherein said suspension comprises up to a total of 100% by weight of the following materials:
   35-45% by weight of iron;
   15-25% by weight of silicon;
   15-25% by weight of at least one alcohol; and
   10-30% by weight of ethyl silicate hybrid binder.

6. A suspension as claimed in claim 4, wherein said at least one alcohol comprises ethanol and/or 2-propanol.

7. A suspension as claimed in claim 4, wherein 1 to 3% by weight of the at least one alcohol is substituted by 1 to 3% by weight of glycerin.

8. A method of manufacturing an electric lamp comprising a lamp vessel accommodating an electric element to which current conductors are connected, which issue from the lamp vessel to the exterior, said lamp vessel being locally coated with a light-absorbing coating which comprises silicon dioxide and iron compounds comprising iron at least partially in an oxidic form, wherein the coating further comprises silicon which, together with silicon dioxide, forms the silicon compounds, the ratio of the weight percentages of the iron compounds and silicon compounds being in the range of 0.17<=iron compounds/silicon compounds<=12, and the ratio of the weight percentages of silicon and silicon dioxide being in the range of 0.5<=silicon/silicon dioxide<=50, the method comprising the steps of:
  applying a wet coating onto the lamp vessel by using the suspension as claimed in claim 4;
  drying the wet coating so as to become a dry coating;
  burning the dry coating onto the lamp vessel so as to become the light-absorbing coating.

9. A method of manufacturing an electric lamp as claimed in claim 8, wherein the operation of burning the dry coating comprises heating the dry coating for 2 to 8 seconds at a temperature in the range of 600° C. to 1000° C.

10. A method as claimed in claim 8, wherein the heating is performed by flames providing a reducing atmosphere.

* * * * *